R. GRANT.
Car Starter.

No. 11,785.

Patented Oct. 10, 1854.

UNITED STATES PATENT OFFICE.

ROBERT GRANT, OF NEW YORK, N. Y.

BRAKE FOR CHECKING AND STARTING CARS.

Specification of Letters Patent No. 11,785, dated October 10, 1854.

*To all whom it may concern:*

Be it known that I, ROBERT GRANT, of the city, county, and State of New York, have invented certain new and useful machinery to be attached and applied to railroad-cars and other vehicles for the purpose of enabling them to stop or cease their motion, thus operating in this behalf substantially in the manner of what is commonly known as a "brake" upon the same, and also for the purpose of aiding or causing the said cars or vehicles, either wholly or partially, to start or move forward again, my said invention operating for either or both of the above purposes, and that the following is a written description of the said discovery and of the usual mode or manner of making and using the same.

My invention consists in the employment and application of a spiral, or other analogous form of spring, of metal, or other suitable material, with certain other devices and appliances hereinafter more fully mentioned to the wheel or axle or other running gear of railroad cars or other vehicles, which can be wound up or compressed at any time by the motion of said cars or vehicles, or by the operation of the wheels or axles of the same, for the purpose as aforesaid of causing their motion to break or cease, and the said vehicles thereby to stop; and this invention is peculiarly adapted in this behalf to railroad cars drawn by horses, in cities or in such places where they are frequently required to stop. And my invention is further intended to enable said cars or vehicles to start or begin their motion again either wholly or partially, thereby assisting and relieving the horses, or other motive power when starting, and aiding and assisting in impelling the said vehicles forward.

Figure 4:
Figure 5:
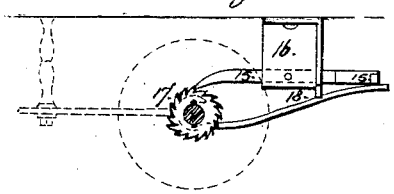

The construction is substantially as follows: The bottom of a car is represented by (1) Figure 1, which may be of any ordinary construction. The wheels (2) and (8) are joined inseparably to the axle (9) in the usual manner of car wheels. A clutch (3), surrounds the axle next to the wheel (2), but not touching it, fastened firmly to a lever or arm (10), so that it will not revolve with the axle. Another clutch (7) is placed in like manner next to the wheel (8) attached to a lever (11), so as to revolve with the axle, there being feathers upon the shaft (indicated by the black spots on the axle in Fig. 1) entering recesses in the clutch (7) so as to cause the same to turn or revolve with the shaft, a form of construction well known. Adjacent to the stationary clutch (3), is another clutch (4), also surrounding the axle, and constructed to receive the clutch (3), so that when the two are pressed together to be united firmly therewith, certain portions of the clutch (4) being so adapted as to enter corresponding recesses in the clutch (3). This clutch (4) may be made hollow on its outer face to allow a small ratchet fastened to the axle, to revolve within it, so as not to interfere with the pressing together of the two clutches (3) and (4). The clutch (4) has within and fastened to its said outer face, a pawl catching into said ratchet fastened so as aforesaid to the axle. This pawl is seen more clearly in Fig. 4 by (12) fastened to clutch (4). The ratchet (13) is keyed upon the axle. A spring (14) fastened to clutch (4), operates upon the pawl so as to keep it always pressed upon the ratchet. This pawl and ratchet do not appear in Fig. 1, for the obvious reason that only the periphery of the clutch (4) is presented; but they need not necessarily be placed within the clutch as herein described, but may be placed simply upon its outer face. Adjacent to the revolving clutch (7) is another clutch (6), also surrounding the axle, so constructed as to receive the clutch (7), so that when the two are pressed together, it is capable of turning with clutch (7), in connection with the axle. This clutch (6) has upon its periphery ratchets, into which a long hand or pawl (15) drops, attached to the car by the standard (16), so as to hold the clutch (6) from turning, in the manner, and under the circumstances hereinafter mentioned. This ratchet upon the clutch (6) is seen more clearly in Fig. 5 (side view of clutch (6) by (17); the pawl by (15) and the standard attached to the car by (16); the pawl turns on a pin or bolt running through the standard, the gravity of its outer end (15') always keeping the inner end, above or out of the ratchets, except when the long spring finger (18), attached to the inner end of lever (11), causes its outer end to rise, thereby pressing the inner end of pawl (15) into the ratchet and thus prevents the clutch (6) from turning. This long spring finger (18) is so constructed as to operate upon the pawl only when the clutches are together.

Figure 3:

The two inner clutches (4) and (6) may be known as male clutches, and the two outer clutches (3) and (7) as female clutches. Between the male clutches, extending from one to the other and surrounding the axle, at a little distance therefrom, is a spiral spring (5) of steel, or other metal, coiled round said shaft, helix-like, the ends of which said spring are respectively fastened to the male clutches. Within this spring, and surrounding and fitting close to the axle, are several rings or sections of tubes, extending the whole distance under the spring upon the axle between the male clutches, which are placed thereon for the purpose of preventing said spring from binding, and to enable it to be wound up freely throughout its entire length. These rings or washers may be of any number, and are seen more clearly in Fig. 3. The effect of these rings is such that if any coil while being wound up, should bind thereupon, the ring immediately beneath said coil, will turn or revolve upon the shaft with said coil, thus allowing the spring to be wound up its entire distance, without inseparably binding upon the axle.

Figure 1:
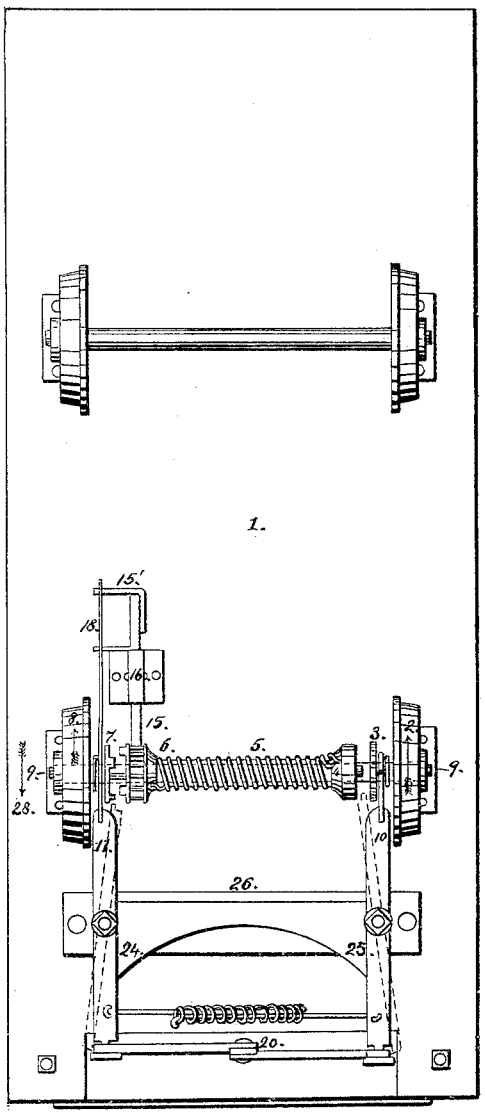
Figure 2:
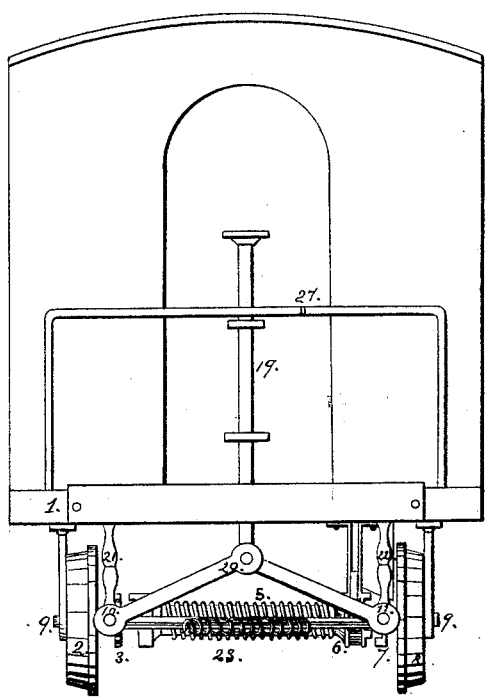

Fig. 2 represents one end of the car. A rod (19) projects through the platform, connected at its lower end with the center of a toggle joint (20), having two arms extending and fastened respectively to the outer ends of the levers (10) and (11). These levers (10) and (11) are clearly seen in Fig. 1, having their fulcrums at (21) and (22), running substantially parallel with the sides of the car back to the axle, where they are respectively fastened to the female clutches. A spring (23), spiral or other suitable form, serves to keep together in a certain position, the outer ends of these levers. A device (24) and (25) fastened to a bar (26) connecting and strengthening the fulcrums (which are seen connected to the car in Fig. 2, by (21) and (22),) may be used to regulate the precise distance they shall be kept together.

When the apparatus is not in action, the center of the toggle joint (20), is raised, (as seen clearly in Fig. 2), the spring (23) aiding to sustain it in its raised position, and keeping the levers (10) and (11) in the position seen in Fig. 1. The levers turn on their fulcrums (21) and (22), in the manner indicated by the dotted lines in Fig. 1. The approach of the outer ends together, and the widening or separation of the inner ends of these levers, causes the male and female clutches to be detached from each other, and this invariably happens when the center of the toggle joint (20) is raised, and the apparatus is not in action as seen in Figs. (1) and (2). When the apparatus is to be used, the rod (19), Fig. 2, is pressed down, by the person conducting the car, which acting on the toggle joint (20) causes it by its depression, to force out or widen the outer ends of the levers (10) and (11), in the manner indicated by the dotted lines in Fig. 1, which turning on their fulcrums (21) and (22), cause the inner ends connected with the female clutches, to approach each other, thereby throwing into connection or gear the male and female clutches. The car or other vehicle being then supposed to be in motion in the direction of the large arrow (28) causes the wheels to turn in the direction of the small arrows on their circumference. The clutches (6) and (7) being then pressed together, revolve with the axle or wheel, being connected therewith by the feathers hereinbefore described. The stationary clutch (3) being then also in connection with the male clutch (4) does not turn, while the axle running through this clutch, turns freely within it, the pawl (12) Fig. 4, playing into the ratch (13) fixed as aforesaid on the axle. The clutches (6) and (7), turning with the axle, wind up the spiral spring (5); the sectional tubes or washers surrounding the shaft, (Fig. 3,) within the helix, prevent the same from binding on the shaft, and thus enable the said spring to be wound up or compressed freely throughout its entire length. When the spring is sufficiently or entirely wound up, the effect is gradually to stop the wheels, and when the same is entirely compressed, the wheels cannot turn and the car necessarily stops. The spring finger (18) causes the pawl (15) to drop into the ratchets upon the clutch (6) so as to prevent a return of the clutch when thus wound up.

When the car is to be started again, the rod (19) Fig. 2, is raised; the spring (23) aids in pulling the outer ends of the levers (10) and (11) together, thus assisting in raising the toggle joint (20) to its original position, and restoring the inner ends of the levers to their original position, thereby disconnecting the male and female clutches respectively. The pawl (15) Figs. 1 and 5, on the car dropping into the ratchets (17) Fig. 5, on the clutch (6), holds the latter from turning back, while the other male clutch (4) Fig. 1, being connected with the ratchet (13) Fig. 4, attached to the axle by the pawl (12) Fig. 4, causes it to turn by the effort of the compressed spring to unwind itself, and thereby causes the wheels again to turn in the direction of the small arrows marked on their peripheries, thus forcing the car forward. When unwound, the levers (10) and (11) are in their original position (as seen in Fig. 1) and the pawl (15) being relieved from the spring finger (18), is raised by its own gravity out of the ratchets on the clutch (6). The spiral spring therefore being wound up by the revolution of a clutch fastened to one end, while the other end remains fixed, has the effect of gradually stopping the car; while the clutch originally revolving being then itself made fast by the pawl (15) the effort of the compressed spring operating on the other end (through the pawl fastened to the clutch (4) and the ratchet upon the axle) causes the wheels to turn in the proper direction to force the car forward. Thus the power expended in stopping the car, and winding up the spring, is reserved and retained to aid in starting the same forward again. If after the spring is wound up, the power compressed therein is not wanted immediately, and it is desired that the car notwithstanding should go forward, the rod (19) Fig. 2, may be pressed or thrown to one side to the point marked (27) Fig. 2, thereby causing the toggle joint to pull the clutch (7) out of the clutch (6), while the lever (10) and the clutches therewith connected remain together as before. The pawl (15) playing into the ratchets on clutch (6) holds the latter fast, thus keeping the spring in a compressed state until wanted, the axle being then able to turn without unwinding the spring, and thus the car will go forward. By causing the rod (19) to resume its original position both clutches may be released and the necessary effect produced.

The various parts hereinbefore described, may be modified and various analogous devices, well known to mechanics substituted therefor, particularly the secondary parts of the apparatus, such as the toggle joint the arrangement or manner of causing the levers to be operated upon by the conductor of the car, and the arrangement of the pawl (15) without in any way altering substantially the principle or character of my invention.

Having thus fully described the said discovery, what I claim therein as new and of my own invention and for which I wish to secure Letters Patent of the United States, is—

1. The application and employment of a spring, spiral or other similar convenient form, of metal or other suitable material, in combination with the axle or wheel or other running gear of rail road cars or other vehicles, constructed and operating substantially as hereinbefore described and for the purpose of stopping and starting, or either, a car or vehicle as hereinbefore mentioned.

2. I also claim the apparatus for winding up or compressing said spring and causing it to act upon the axle or wheel by means of the fast and revolving clutches with their connections and escapements substantially as hereinbefore described.

3. I also claim the employment and application of sectional tubes or washers on the axle or shaft when used in the said combination for the purpose of preventing the spring from binding and to enable the same to be easily and fully compressed.

ROBERT GRANT.

In presence of—
WILLIAM MOOTRY,
JAMES P. HYATT.